(12) United States Patent
Griep et al.

(10) Patent No.: US 7,793,420 B2
(45) Date of Patent: Sep. 14, 2010

(54) DRIVE MECHANISM AND POWER TOOL

(75) Inventors: David B. Griep, Rubicon, WI (US);
Richard H. Jungmann, Richfield, WI (US); Roger D. Neitzell, North Prairie, WI (US); Thomas P. James, Oconomowoc, WI (US); Thomas R. Bednar, Pewaukee, WI (US); Troy Charles Thorson, Waukesha, WI (US); David Paul Serdynski, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 12/033,260

(22) Filed: Feb. 19, 2008

(65) Prior Publication Data
US 2008/0189963 A1 Aug. 14, 2008

Related U.S. Application Data

(60) Division of application No. 10/874,890, filed on Jun. 23, 2004, now abandoned, which is a continuation-in-part of application No. 10/602,210, filed on Jun. 24, 2003, now abandoned.

(51) Int. Cl.
*B27B 19/04* (2006.01)
(52) U.S. Cl. .......................................... 30/394; 83/748
(58) Field of Classification Search .................. 30/394, 30/392, 393; 83/748; 173/211, 210; 56/306
See application file for complete search history.

(56) References Cited

U.S. PATENT DOCUMENTS

| | | | | |
|---|---|---|---|---|
| 110,175 | A * | 12/1870 | Walker | .......................... 74/36 |
| 820,789 | A | 5/1906 | Hutchins | |
| 1,532,358 | A * | 4/1925 | Weidemann | .................. 56/306 |
| 1,697,065 | A | 1/1929 | James | |
| 1,780,727 | A | 11/1930 | Tenney | |
| 2,004,712 | A | 6/1935 | Thiry | |
| 2,560,644 | A | 7/1951 | Hartzell | |
| 2,621,685 | A | 12/1952 | Butz | |
| 3,071,850 | A | 1/1963 | Haushalter | |
| 3,080,897 | A * | 3/1963 | Winter | .......................... 83/750 |
| 3,404,574 | A | 10/1968 | Stelljes | |
| 3,427,827 | A | 2/1969 | Airheart | |
| 3,547,166 | A * | 12/1970 | Dudek | ..................... 83/698.21 |
| 3,603,173 | A | 9/1971 | Brooks | |
| 3,768,334 | A | 10/1973 | Ditlinger | |
| 3,782,220 | A | 1/1974 | Ditlinger | |

(Continued)

FOREIGN PATENT DOCUMENTS

FR 1380509 12/1964

(Continued)

*Primary Examiner*—Kenneth E. Peterson
(74) *Attorney, Agent, or Firm*—Michael Best & Friedrich LLP

(57) ABSTRACT

A drive mechanism for a power tool. The power tool includes a motor having a drive shaft and an output member adapted to support a tool element. The drive mechanism includes a drive assembly engaged with and driven by the drive shaft and a drive arm drivingly connected between the drive assembly and the output member to transmit driving force from the drive assembly to the output member. The drive arm is configured to absorb an impact.

20 Claims, 14 Drawing Sheets

U.S. PATENT DOCUMENTS

| | | |
|---|---|---|
| 3,850,255 A | 11/1974 | Koehler |
| 3,859,821 A | 1/1975 | Wallace |
| 3,945,120 A | 3/1976 | Ritz |
| 4,552,543 A | 11/1985 | Wolf et al. |
| 4,569,248 A | 2/1986 | Hug |
| 4,648,468 A | 3/1987 | Honsa |
| 4,764,152 A | 8/1988 | Jorg et al. |
| 5,054,562 A | 10/1991 | Honsa et al. |
| 5,083,376 A | 1/1992 | Lentino |
| 5,127,279 A | 7/1992 | Barthruff |
| 5,314,051 A | 5/1994 | Marie et al. |
| 5,564,981 A | 10/1996 | Iwabuchi et al. |
| 5,607,023 A | 3/1997 | Palm |
| 5,689,891 A | 11/1997 | Bednar et al. |
| 5,860,218 A | 1/1999 | Vinciguerra |
| 6,044,818 A | 4/2000 | Decuir |
| 6,212,781 B1 * | 4/2001 | Marinkovich et al. ......... 30/394 |
| 6,234,255 B1 | 5/2001 | Feldmann et al. |
| RE37,211 E | 6/2001 | Bednar et al. |
| 6,272,971 B1 | 8/2001 | Thomsen et al. |
| 6,324,940 B1 | 12/2001 | Pazdirek et al. |
| RE37,529 E | 1/2002 | Bednar et al. |

FOREIGN PATENT DOCUMENTS

| | | |
|---|---|---|
| JP | 60157516 | 8/1985 |

* cited by examiner

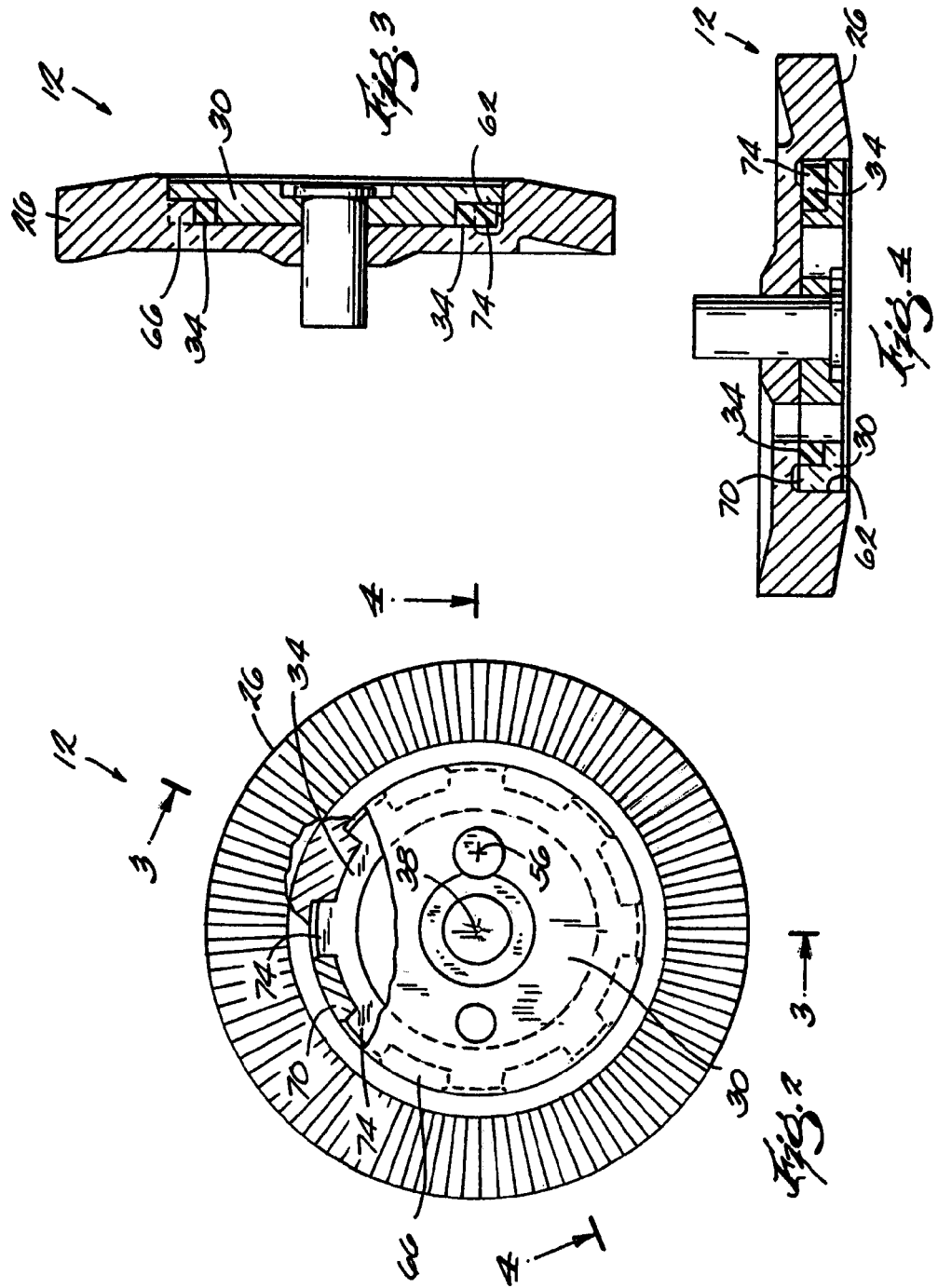

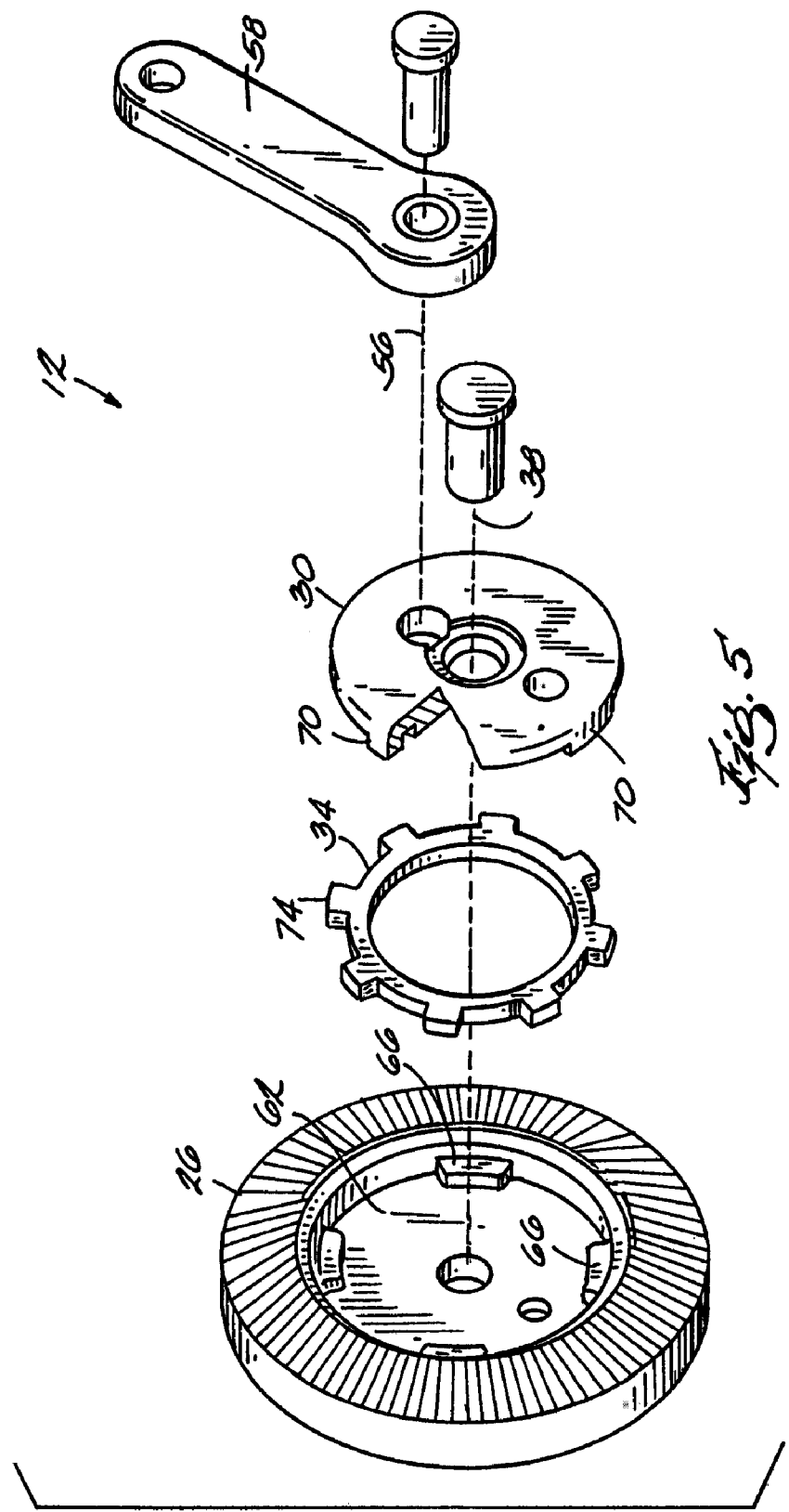

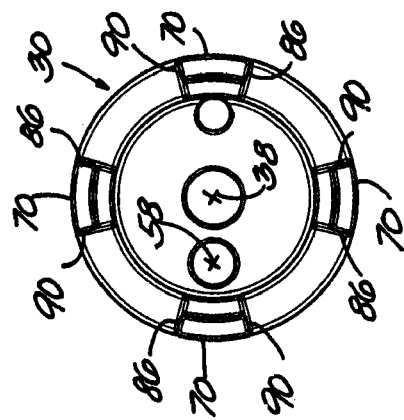
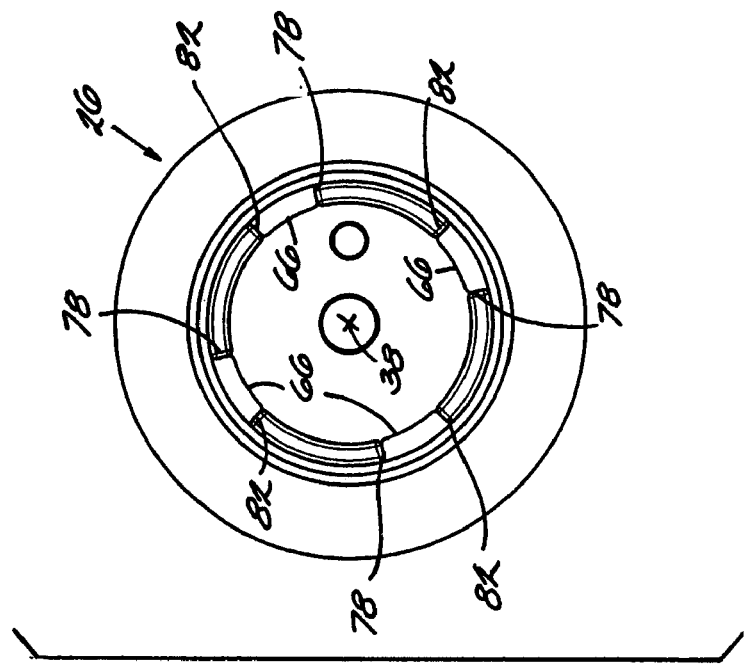
Fig. 6

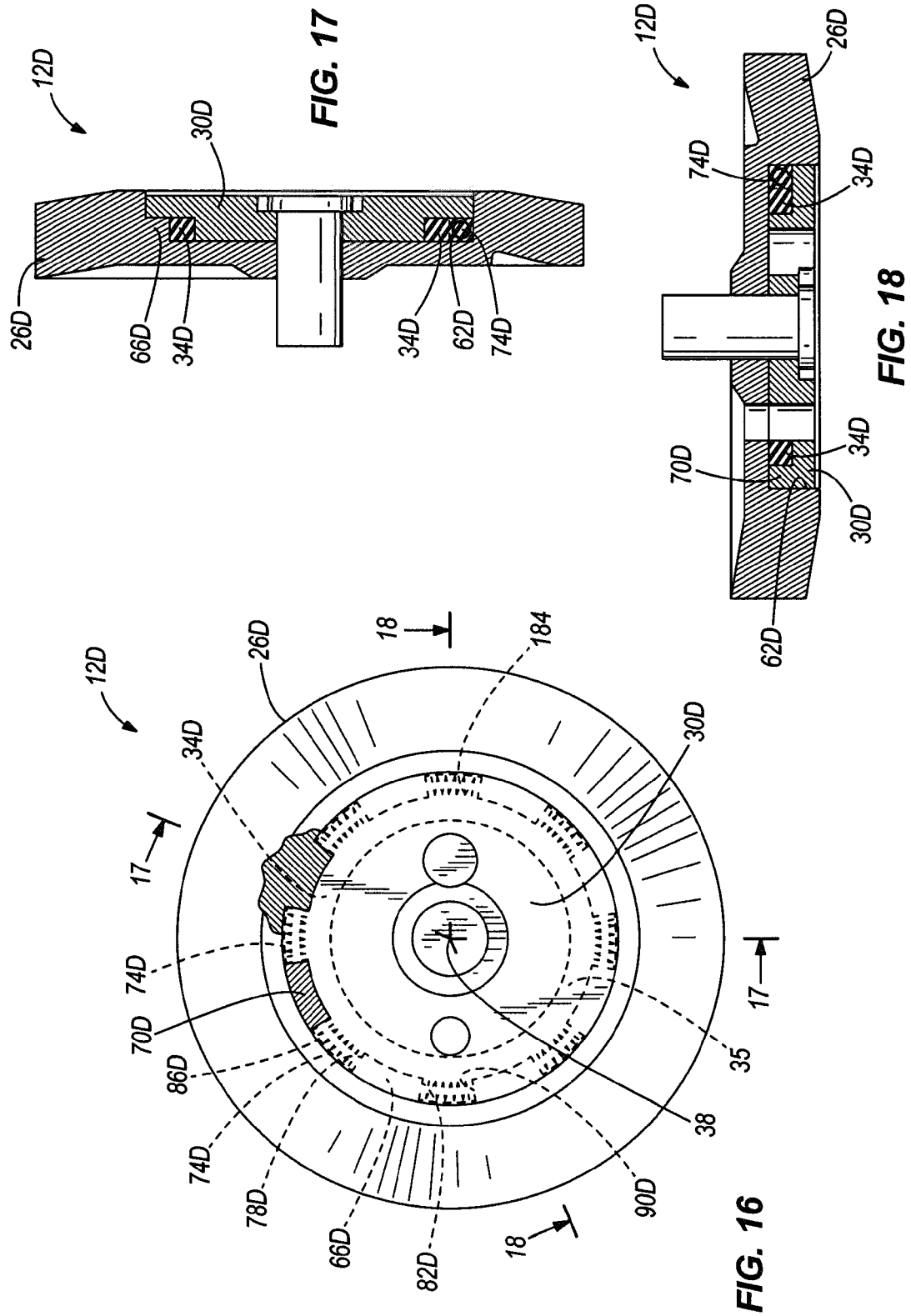

DRIVE MECHANISM AND POWER TOOL

RELATED APPLICATIONS

The present application is a divisional of U.S. patent application Ser. No. 10/874,890, filed Jun. 23, 2004, now abandoned, which is a continuation-in-part of U.S. patent application Ser. No. 10/602,210, filed Jun. 24, 2003, the entire contents of both of which are hereby incorporated by reference.

FIELD OF THE INVENTION

The present invention relates to drive mechanisms and, more particularly, to a drive mechanism for a power tool.

SUMMARY OF THE INVENTION

A power tool, such as, for example, a reciprocating saw, generally includes a housing supporting a motor, an output member adapted to support a tool element and a drive mechanism to drive the output member. In the reciprocating saw, the motor and the drive mechanism operate to reciprocate a spindle and a saw blade supported by the spindle.

During operation, as the spindle and saw blade are reciprocated, the saw blade may be pinched or bind in the workpiece or may strike a solid object, preventing the saw blade from reciprocating. The sudden stopping of the tool element or saw blade can damage the spindle, the drive mechanism and/or the motor.

The present invention provides, among other things, a drive mechanism, a power tool and a reciprocating saw which substantially alleviates one or more of the above-described and other independent problems with existing drive mechanisms, power tools and reciprocating saws. In some aspects and in some constructions, the present invention provides a drive mechanism generally including structure to allow relative movement of components of the drive mechanism to, for example, absorb an impact on the tool element or on the output member. In some aspects and in some constructions, the present invention provides a drive mechanism generally including an elastic member allowing relative movement of components of the drive mechanism to, for example, absorb an impact.

More particularly, in some aspects and in some constructions, the present invention may provide a drive mechanism for a power tool, the power tool generally including a motor including a drive shaft and an output member adapted to support a tool element. The drive mechanism may generally include a drive assembly engaged with and driven by the drive shaft, and a drive arm drivingly connected between the drive assembly and the output member to transmit driving force from the drive assembly to the output member. The drive arm may be configured to absorb an impact.

In one construction, the drive assembly may include a gear rotatably driven about an axis by the drive shaft and drivingly connected to the drive arm. In another construction, the drive arm may connect the gear to the output member to convert the rotation of the gear to reciprocation of the output member. In another construction, the drive assembly may also include a hub selectively driven by the gear and an elastic member positioned between the gear and hub to absorb the impact.

In one construction, the drive arm may have a first portion and a second portion, one of the first portion and the second portion being a flexible portion. In another construction, the flexible portion may be configured to absorb the impact and includes a flexible member. In another construction, the drive arm may further include a third portion, and the flexible member is located between the second portion and the third portion. In another construction, the second and third portions may be interlocked to limit the amount of deflection generated in the arm. In another construction, the flexible portion may have flexure points to create an area of deformation to absorb the impact. In another construction, the power tool may be a reciprocating saw, and the drive arm may absorb impact resulting from a blade lock-up.

Also, in some aspects and in some constructions, the present invention provides a drive mechanism for a power tool, the power tool generally including a motor including a drive shaft and an output member adapted to support a tool element. The drive mechanism may generally include a gear driven by the drive shaft for rotation about an axis, a hub selectively driven by the gear for rotation about the axis, the hub being movable relative to the gear, the hub driving the output member, and structure positioned between the gear and the hub, the structure selectively transmitting drive force from the gear to the hub and selectively allowing relative movement between the gear and the hub.

In one construction, the drive shaft supports a pinion, and the gear has an outer periphery defining teeth, the teeth preferably being engaged with and driven by the pinion to rotate the gear about the axis. In another construction, the hub is rotatable about the axis relative to the gear and may have a drive member offset from the axis and connected to the output member to drivingly connect the hub to the output member. In another construction, the drive mechanism may further comprise a drive arm connecting the drive member to the output member to convert rotation of the hub to reciprocation of the output member.

In one construction, the structure may include an elastic member. The gear may define a pocket and includes a gear protrusion in the pocket, and a portion of the hub may be supported in the pocket and includes a hub protrusion, the gear protrusion drivingly engaging the hub protrusion. In one construction, at least a portion of the elastic member may be positioned between the gear protrusion and the hub protrusion. In another construction, the structure is a slip clutch.

In some constructions, the power tool may be a reciprocating saw, the output member may be a reciprocatable spindle, and the tool element may be a saw blade operable to cut a workpiece. In such constructions, the structure may preferably absorb impact resulting from a blade lock-up.

In addition, in some aspects and in some constructions, the present invention may provide a power tool generally including a housing, a motor supported by the housing and having a drive shaft, an output member supported by the housing and adapted to support a tool element, and a drive mechanism supported by the housing and operable to drive the output member. The drive mechanism may generally include a gear driven by the drive shaft for rotation about an axis, a hub selectively driven by the gear for rotation about the axis, the hub being movable relative to the gear, and structure positioned between the gear and the hub, the structure selectively transmitting drive force from the gear to the hub and selectively allowing relative movement between the gear and the hub.

Further, in some aspects and in some constructions, the present invention provides a reciprocating saw generally including a housing, a motor supported by the housing and having a drive shaft, a spindle supported by the housing and adapted to support a saw blade, and a drive mechanism supported by the housing and operable to drive the spindle. The drive mechanism may generally include a gear driven by the drive shaft for rotation about an axis, a hub selectively driven by the gear for rotation about the axis, the hub being movable relative to the gear, and structure to absorb impact positioned between the gear and the hub, the structure selectively transmitting drive force from the gear to the hub and allowing relative movement between the gear and the hub to absorb an impact on the spindle.

Independent features and independent advantages of the present invention will become apparent to those skilled in the art upon review of the following detailed description, claims and drawings.

BRIEF DESCRIPTION OF THE DRAWINGS

FIG. 2 is a side partial cross-sectional view of a portion of the drive mechanism shown in FIG. 1.

FIG. 3 is a cross-sectional view taken generally along line 3-3 in FIG. 2.

FIG. 4 is a cross-sectional view taken generally along line 4-4 in FIG. 2.

FIG. 5 is an exploded perspective view of a portion of the drive mechanism shown in FIG. 1.

FIG. 6 is a plan view of the drive mechanism gear and hub components.

FIG. 12 is a side cross-sectional view of an alternative construction of a power tool, such as, for example a reciprocating saw.

FIG. 16 is a side partial cross-sectional view of an alternative construction of a power tool, such as, for example a reciprocating saw.

FIG. 17 is a cross-sectional view taken generally along line 17-17 in FIG. 16.

FIG. 18 is a cross-sectional view taken generally along line 18-18 in FIG. 16.

Figure 1:
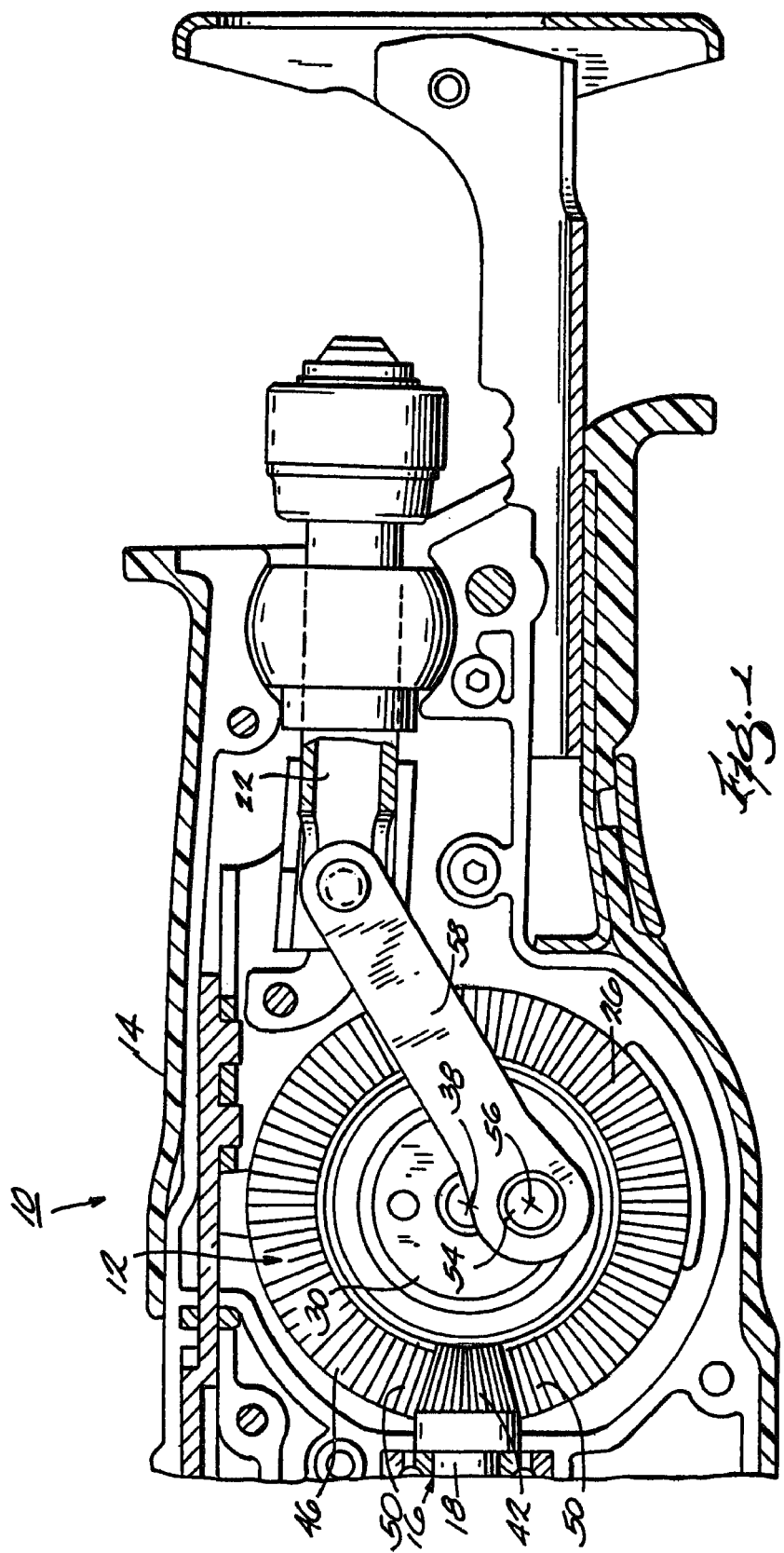
FIG. 1 is a side partial cross-sectional view of a power tool, such as, for example a reciprocating saw.

Before at least one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION

A power tool, such as, for example, a reciprocating saw 10, and a drive mechanism 12 embodying independent aspects of the invention are illustrated in FIG. 1. It should be understood that, for some aspects of the invention and in some constructions (not shown), the power tool may be another type of power tool, such as, for example, a hammer, a rotary hammer, a circular saw, a drill, etc., or another type of powered equipment or device, such as, for example, a compressor, an engine, a motor, a pneumatic tool, an appliance, a hydraulic motor, a generator, etc.

As shown in FIG. 1, the reciprocating saw 10 generally includes a housing 14 that supports a motor 16 (partially shown). The motor 16 includes a drive shaft 18 that engages the drive mechanism 12 to drive an output member or spindle 22. In the illustrated construction, the spindle 22 is supported by the housing 14 for generally reciprocating movement and is adapted to support a tool element, such as a saw blade (not shown). It should be understood that the spindle 22 may be supported and driven to also partially move in a direction transverse to the axis of reciprocation to provide, for example, orbital motion or rocking motion, of the spindle 22 and saw blade.

In the illustrated construction and in some aspects, the drive mechanism 12 generally includes a gear 26, a hub 30 (see FIGS. 2-5) and structure, such as an elastic member 34, at least partially between (in a force-transmitting and/or positional sense) the gear 26 and the hub 30. As shown in FIG. 1, the drive shaft 18 drives the gear 26 for rotation about an axis 38. The gear 26 selectively drives the hub 30 for rotation about axis 38. The hub 30 is supported for movement, such as, for example, limited pivoting or rotational movement about the axis 38, relative to the gear 26. As explained below in more detail, the hub 30 drives the spindle 22. As shown in FIGS. 2-5, the elastic member 34 is positioned at least partially between (in the illustrated construction, in both a force-transmitting and positional sense) the gear 26 and the hub 30 to selectively transmit drive force from the gear 26 to the hub 30 and to selectively allow relative movement between the gear 26 and the hub 30 to, for example, absorb an "impact" on the spindle 22 or saw blade.

As used herein, an "impact" may result from relative movement or forces tending to cause relative movement between components of the drive arrangement (i.e., the motor 16, the drive mechanism 12, etc.). Such relative movement may be undesirable and may wear and/or damage the components. For example, an impact may occur if the tool element binds on a workpiece (i.e., a saw blade being pinched by the workpiece) or strikes an obstacle while the drive mechanism 12 and/or the motor 16 continue to apply a drive force. An impact may also occur if the output element is stopped because it strikes an obstacle or due to friction between the spindle 22 and the spindle support while the motor 16 continues to apply driving force. In addition, an impact may occur if the motor 16 is stopped while the inertia of the drive mechanism 12 and/or the driven mechanism (i.e., the output element and/or the tool element) continues movement of these components.

As shown in FIG. 1, the drive shaft 18 supports a pinion 42. The gear 26 includes an outer periphery 46 defining teeth 50, and the pinion 42 engages the teeth 50 to rotate the gear 26 about the axis 38. The hub 30 includes a drive member 54 offset from axis 38 and defining an eccentric axis 56. A drive arm 58 is connected between the drive member 54 and the spindle 22 and drivingly connects the hub 30 to the spindle 22 to convert rotational movement of the hub 30 into generally reciprocating movement of the spindle 22.

A more detailed illustration of the drive mechanism 12 is shown in FIGS. 2-5. In the illustrated construction, the gear 26 defines a pocket 62 and includes at least one and, in the illustrated construction, four gear protrusions 66. In the illustrated construction, a portion of the hub 30 is supported in the pocket 62. The hub 30 includes at least one and, in the illustrated construction, four hub protrusions 70. The gear protrusion 66 selectively drivingly engages the hub protrusion 70 (through the elastic member 34), transmitting driving force from the gear 26 to the hub 30 and causing rotation of the hub 30 with the gear 26.

It should be understood that, in some constructions (not shown), the gear 26 may not define a pocket 62, and the hub 30 may not be positioned in such a pocket. In such constructions, the gear 26 and the hub 30 may be positioned in axial face-to-face relation. It should also be understood that, in some aspects and in some constructions (not shown), substantially all of the hub 30 may be positioned in the pocket 62.

In the illustrated constructions, the gear protrusions 66 and the hub protrusions 70 are generally the same size and generally equally spaced apart. It should be understood that in some constructions (not shown), the gear protrusions 66 and the hub protrusions 70 may be of different sizes and/or may be spaced apart unequally.

At least a portion of the elastic member 34 is positioned between the gear 26 and the hub 30 to selectively transmit driving force from the gear 26 to the hub 30 and to selectively allow relative movement between the gear 26 and the hub 30 to, for example, absorb an impact on the spindle 22 or on the saw blade. In the illustrated construction, the elastic member 34 includes a body and at least one and, in the illustrated construction, eight elastic member protrusions 74 connected to the body. Preferably, an elastic member protrusion 74 is positioned between each adjacent gear protrusion 66 and hub protrusion 70.

As shown in FIG. 6, each gear protrusion 66 includes a gear protrusion first side 78 and a gear protrusion second side 82, and each hub protrusion 70 includes a hub protrusion first side 86 and a hub protrusion second side 90. In the illustrated construction, an elastic member protrusion 74 is positioned circumferentially between a gear protrusion first side 78 and a hub protrusion first side 86, and another elastic member protrusion 74 is positioned circumferentially between a gear protrusion second side 82 and a hub protrusion second side 90.

It should be understood that, in some constructions (not shown), the elastic member 34 may not include a body but may include separate, independent elastic members (similar to the elastic member protrusions 74) between adjacent gear protrusions 66 and hub protrusions 70. In some other constructions (not shown), fewer than all of the elastic member protrusions 74 may be connected to a body portion, and the remaining elastic member portions 74 may be connected to another body portion, or may be separate from and independent of a body portion.

In the illustrated construction, the elastic member 34 is formed of rubber. In other constructions, the elastic member 34 may be formed of another elastomeric material, such as, for example, silicone, neoprene, nitrile, EPDM, or polymers of various durometer. Also, in other constructions (not shown), the elastic member 34 may have a geometry and/or construction providing the necessary characteristics, such as elasticity, resiliency, etc. (i.e., a cut-out portion).

In operation, under normal conditions, when the motor 16 is operated, the drive shaft 18 rotates the gear 26, and the gear 26 rotates the hub 30 (through the elastic member 34). Eccentric rotation of the drive member 54 and the resulting motion of the drive arm 58 causes reciprocation of the spindle 22 (and of the saw blade). At start-up and during operation, the elastic member 34 may be initially slightly compressed to a driving force-transmitting condition.

If the saw blade and/or the spindle 22 is stopped suddenly (i.e., because of an impact), the hub 30 may be slowed (relative to the rotational speed of the gear 26) or may stop rotating. If the motor 16 continues to operate, the drive shaft 18 continues to rotate the gear 26. In such a condition, the elastic member 34 allows relative rotational movement between the rotating gear 26 and the slowed or stopped hub 30. Each elastic member protrusion 74 is compressed to an impact-absorbing condition between each adjacent gear protrusion 66 and hub protrusion 70. The elastic member 34 thus operates to absorb the impact which may prevent wear or damage to the components of the reciprocating saw 10 (including the drive mechanism 12 and the motor 16). After the impact is absorbed, the elastic member 34 returns to its original uncompressed condition or to the slightly compressed driving-force transmitting condition.

While, in the illustrated construction, the elastic member 34 is compressed to absorb an impact, it should be understood that, in other constructions (not shown), the elastic member 34 may be arranged to be in tension, torsion, etc. to absorb the impact.

It should be understood that the term "elastic" is a relative term. In the illustrated construction, the elastic member 34 is sufficiently rigid to transmit driving force between the gear 26 and the hub 30 and sufficiently flexible to accommodate some relative movement between the gear 26 and the hub 30 to, for example, absorb an impact. Also, in the illustrated construction, the elastic member 34 is sufficiently resilient to substantially (and, preferably, repeatedly) return to its original shape after operation and after absorbing an impact.

In other constructions (not shown), the structure between the gear 26 and the hub may include another type of elastic member, such as a spring. Such a spring may be a compression, tension or torsion spring, formed of, for example, spring steel. The structure may include yet other types of elastic members, such as, for example, air-damped shock absorbers, fluid-damped systems, etc., and/or combinations of elastic members.

It should be understood that, in some constructions (not shown), the structure between the gear 26 and the hub 30 may include flexible and/or flexibly-mounted gear protrusions (not shown) and/or hub protrusions (not shown) on the gear 26 and on the hub 30, respectively. In such constructions (not shown), the gear protrusions and/or the hub protrusions selectively transmit the drive force and selectively allow the relative movement between the gear 26 and the hub 30.

It should also be understood that, for some aspects and in some constructions (such as the constructions shown in FIGS. 12-15), the structure between the gear 26 and the hub 30 may be between the gear 26 and the hub 30 in only a force-transmitting sense. Such structure may be provided by a slip clutch 94 between the gear 26 and the hub 30 (see FIG. 13). The details of the slip clutch 94 will be described in detail below with respect to FIGS. 12-15.

In addition, it should be understood that, for some aspects and in some constructions (not shown), the structure between the gear 26 and the hub 30 may include another drive arrangement (not shown) between the gear 26 and the hub 30. For example, a frictional drive arrangement may be provided between (in both a force-transmitting and positional sense) the gear 26 and the hub 30, and relative movement of the gear 26 and the hub 30 may occur if a force is applied to overcome this frictional engagement.

In the construction illustrated in FIGS. 1-6, the structure transmits drive force between the gear 26 and the hub 30 in both directions of rotation about the axis 38. Also, in the illustrated construction, the structure transmits substantially the same force (i.e., allows relative movement of the gear 26 and the hub 30 at substantially the same opposing force threshold or impact force) in both rotational directions. In other constructions (not shown), the structure may transmit drive force and/or allow relative movement between the gear 26 and the hub 30 in only one rotational direction (i.e., impact absorption provided in only a "forward" drive direction and not in an opposite "reverse" drive direction). In other constructions (not shown), the structure may transmit different forces in the opposite rotational directions (i.e., a different "impact" force required for relative movement of the gear 26 and the hub 30).

Figure 7:
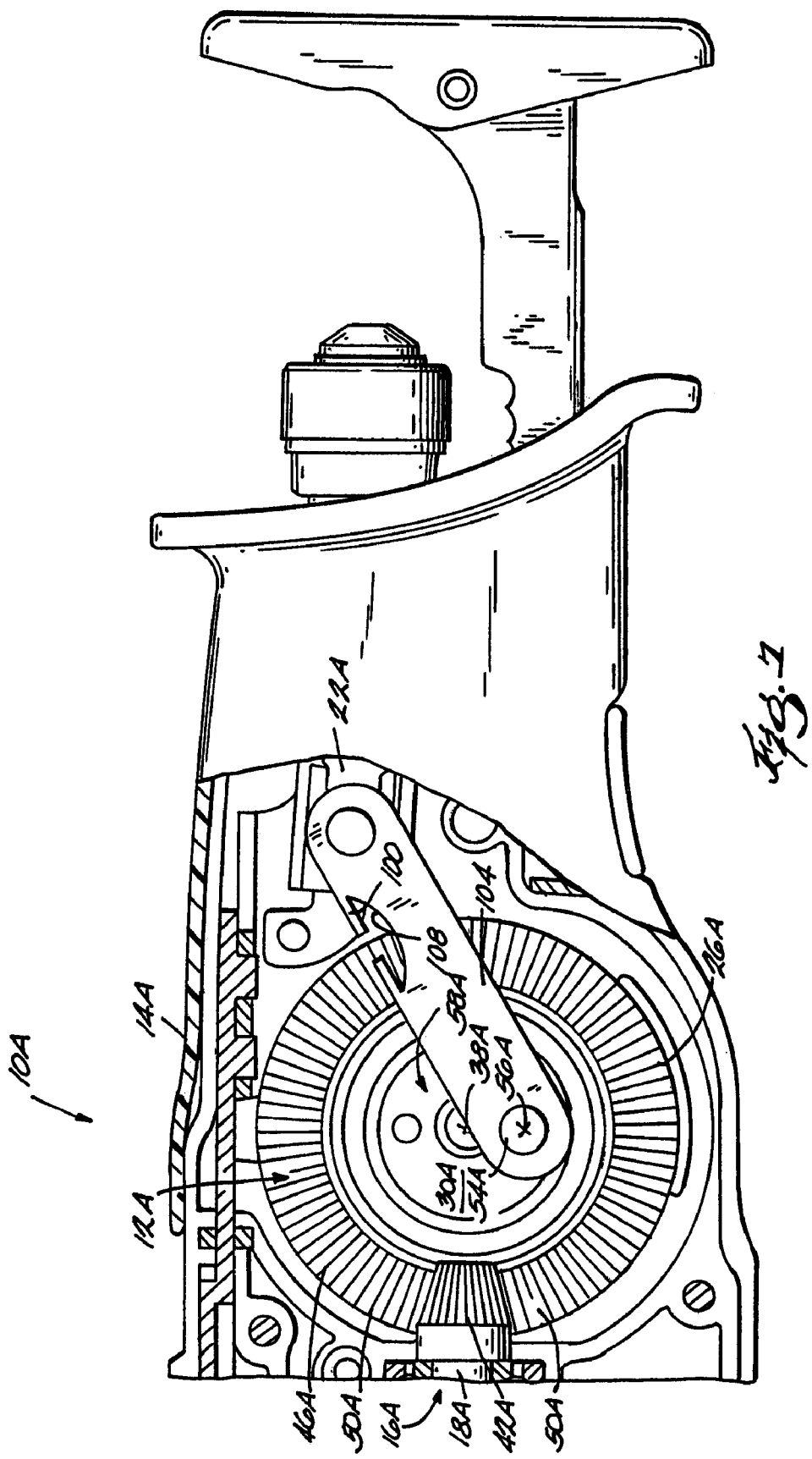
FIG. 7 is a side partial cross-sectional view of an alternative construction of a power tool, such as, for example a reciprocating saw.

In other constructions, another component of the drive mechanism may be configured to absorb impact. For example, a power tool, such as, for example, a reciprocating saw 10A, including a drive mechanism 12A with an impact-absorbing drive arm 58A is illustrated in FIG. 7. Common elements are identified by the same reference number "A".

As shown in FIG. 7, the drive mechanism 12A includes the drive arm 58A connected between a drive member 54A and the spindle 22A. In the illustrated construction, the drive arm 58A generally includes a first portion 100 and a second portion 104, and one of the first portion 100 and the second portion 104 (e.g. the first portion 100) is a flexible portion. In the illustrated construction, the flexible portion 100 generally includes flexure points 108 formed in the drive arm 58A that allow for compression and/or movement to absorb impact in the drive mechanism 12A.

As shown in FIG. 7, the flexure point 108 is a cut-out area of known geometry to allow for a generally known amount of deflection. However, in other constructions (not shown), the flexure point 108 may be provided by a reduced thickness portion of the drive arm 58A that allows for deflection in the drive arm 58A. In yet other constructions (not shown), the flexible portion 100 may be provided by a flexure point 108 cut out of the drive arm 58A which is then filled with a flexible member. In such constructions, the flexible member (not shown) may be formed of a different material than the second portion 104 such as, for example, elastomeric material, rubber, silicone, neoprene, etc.

In the illustrated construction, the drive arm 58A drivingly connects a hub 30A to the spindle 22A to convert rotational movement of the hub 30A into generally reciprocating movement of the spindle 22A. It should be understood that the drive arm 58A can be utilized with a gear and hub drive mechanism 12 (as described above for FIGS. 1-6), a scotch yoke drive mechanism, a wobble plate drive mechanism, or other drive mechanism. Also, it should be understood that the drive arm 58A could be used with the construction illustrated in FIGS. 1-6, or with the construction illustrated in FIGS. 12-14 for greater impact absorption.

Figure 8:
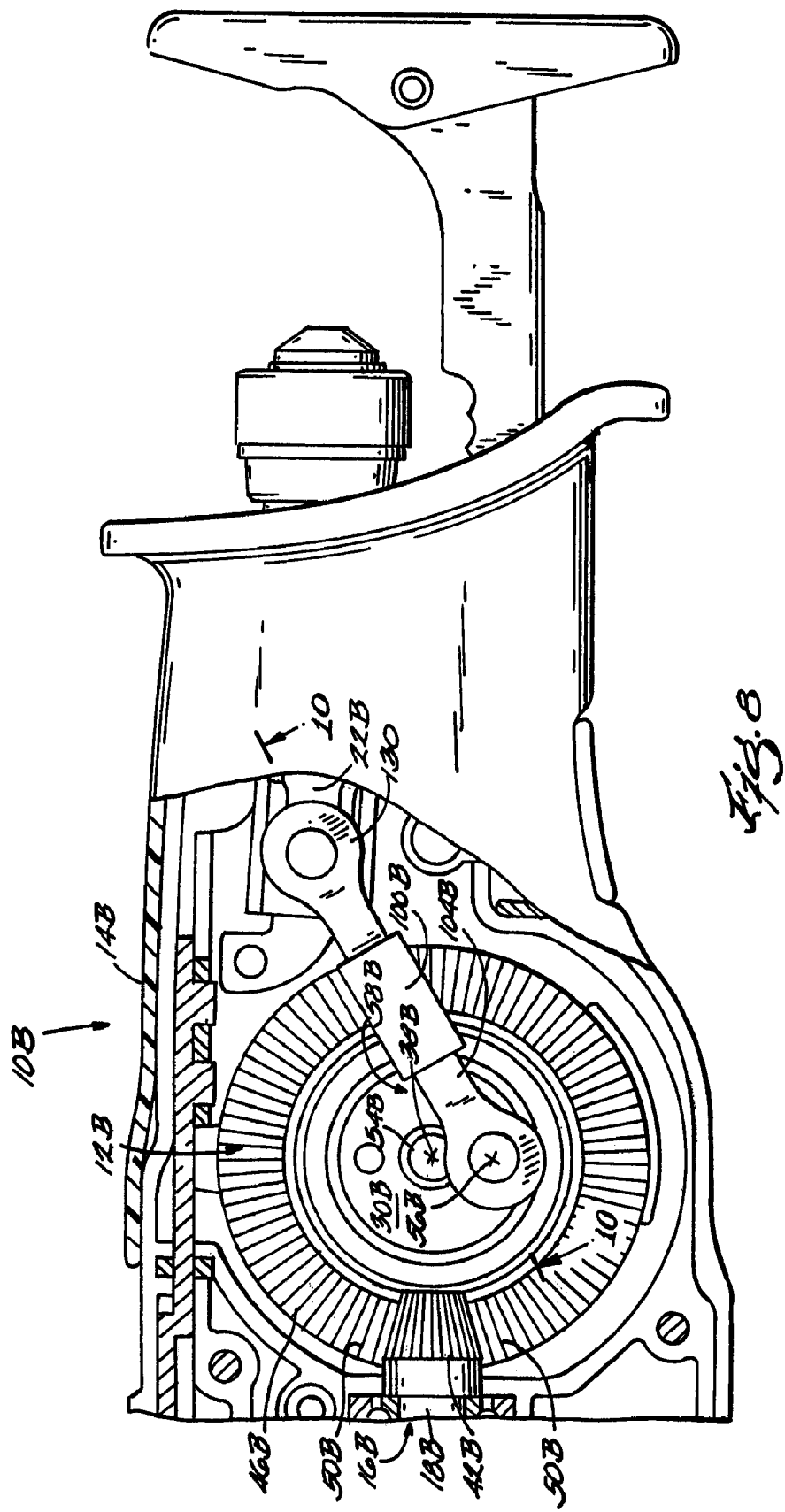
FIG. 8 is a side partial cross-sectional view of another alternative construction of a power tool, such as, for example a reciprocating saw.

FIG. 8 illustrates another construction of a power tool, such as, for example, a reciprocating saw 10B, including a drive mechanism 12B with an impact-absorbing drive arm 58B. Common elements are identified by the same reference number "B".

As shown in FIG. 8, the drive mechanism 12B generally includes the drive arm 58B that is configured to absorb impact on the drive mechanism 12B. As illustrated, the drive arm 58B includes a first portion 100B, a second portion 104B, and a third portion 130. In the illustrated construction, the first portion 100B is a flexible member and is located between the second portion 104B and the third portion 130. The flexible member 100B may be insert molded between the second portion 104B and third portion 130. As illustrated, the flexible member 100B is formed of a different material than the second portion 104B and the third portion 130 such as, for example, elastomeric material, rubber, etc. By varying the material used to form the flexible member 100B, varying amounts of impact absorption can be achieved within the drive mechanism 12B. Further as illustrated, the second portion 104B and the third portion 130 are formed of relatively non-flexible material, although it should be understood that the second portion 104B and/or the third portion 130 may be formed of a relatively flexible material as well.

Figure 10:
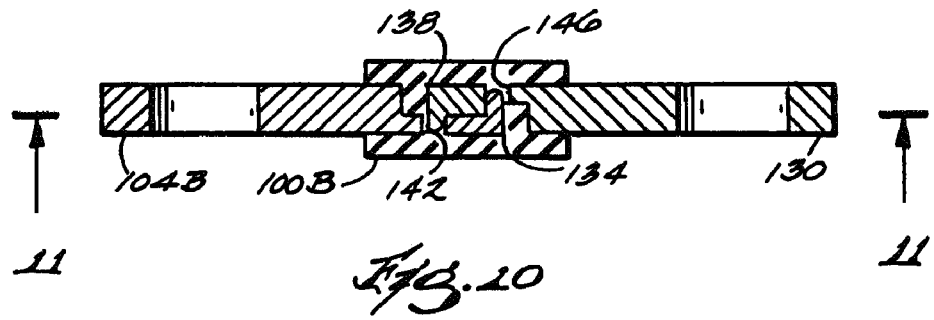
FIG. 10 is a cross-sectional view taken generally along line 10-10 of FIG. 8.
Figure 11:
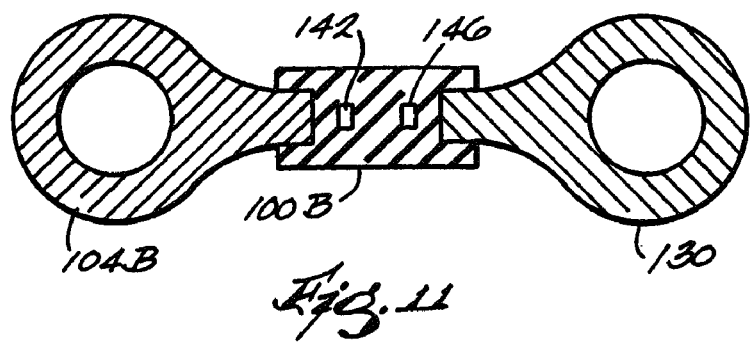
FIG. 11 is a cross sectional view taken generally along line 11-11 of FIG. 10.
Figure 9:
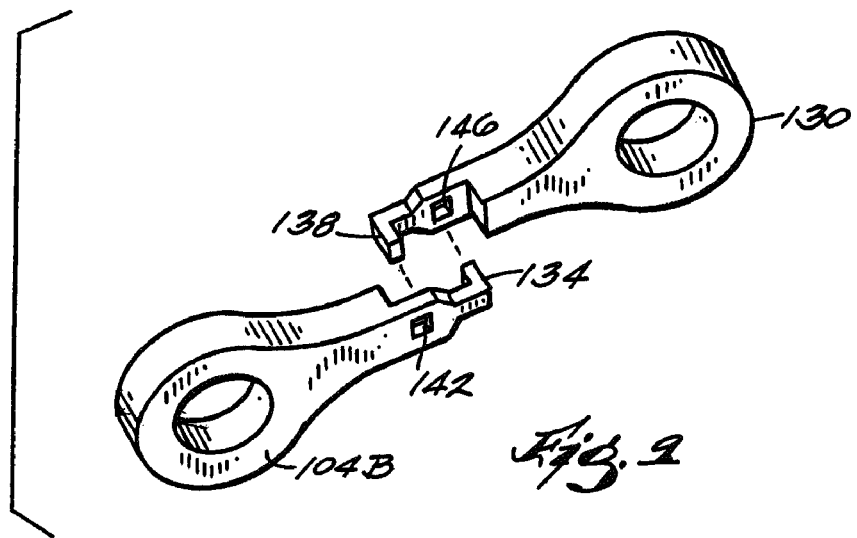
FIG. 9 is an exploded view of an alternative drive arm according to FIG. 8.
Figure 11:
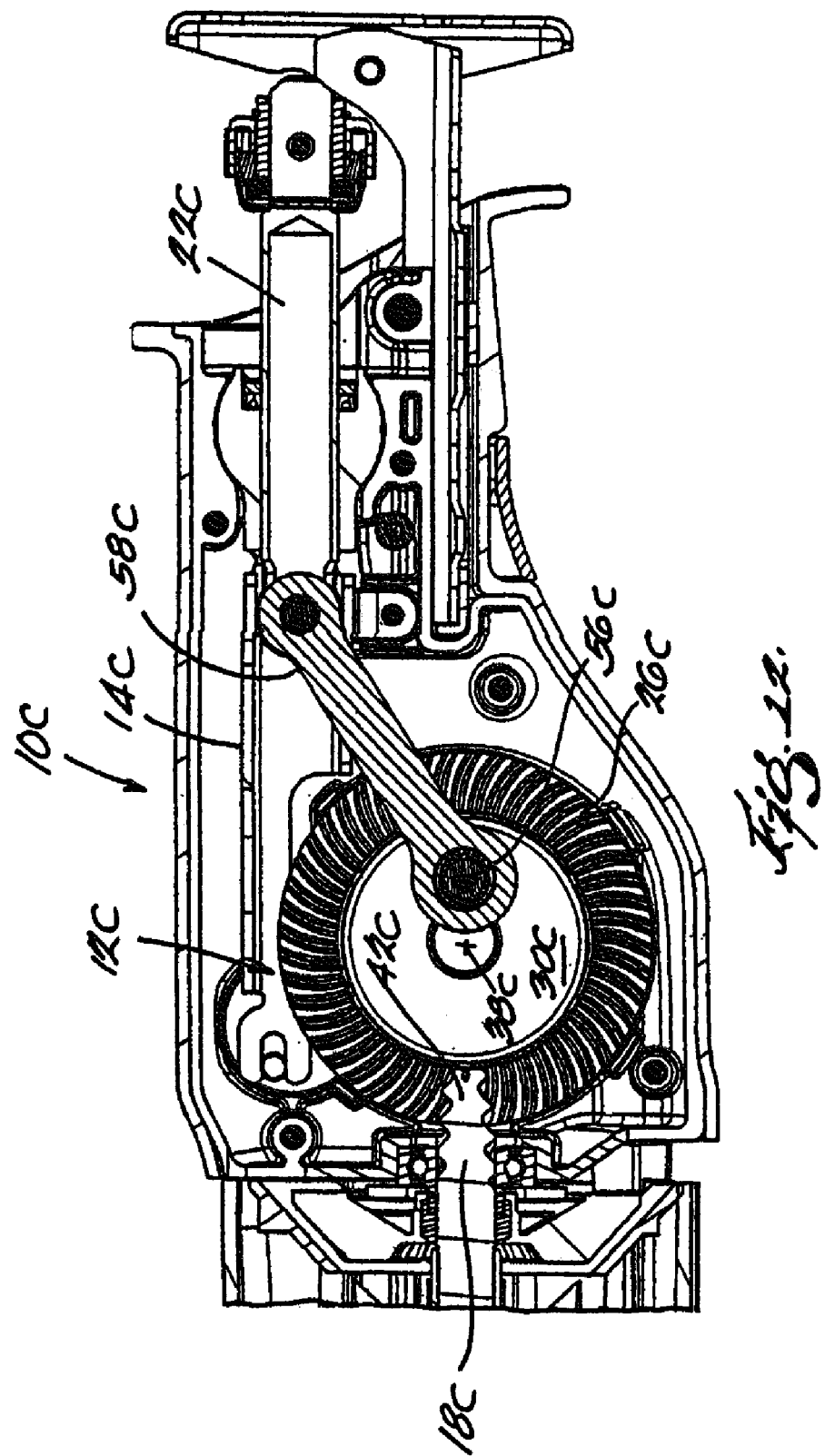

As illustrated in FIGS. 9-11, the second portion 104B and third portion 130 can be interlocking to limit the amount of deflection through the assembly of the drive arm 58B. With reference to FIG. 9, the second portion 104B includes a hook 134 that interacts with a similar hook 138 on the third portion 130. The first portion 100B may be molded over the hooks 134, 138 to provide a flexible member to allow for impact absorption in the drive mechanism 12B, and the interaction of the hooks 134, 138 limits the amount of deflection (compression, tension, and/or torsion) in the drive arm 58B to provide for a relatively stable drive arm 58B. As illustrated, each hook 134, 138 includes an aperture 142, 146 for receiving the end of the opposing hook 138, 134 thus interlocking the hooks 134, 138 together.

FIGS. 12-15 illustrate another construction of a power tool, such as, for example, a reciprocating saw 10C, including a drive mechanism 12C. Common elements are referred to by the same reference number "C".

Figure 13:
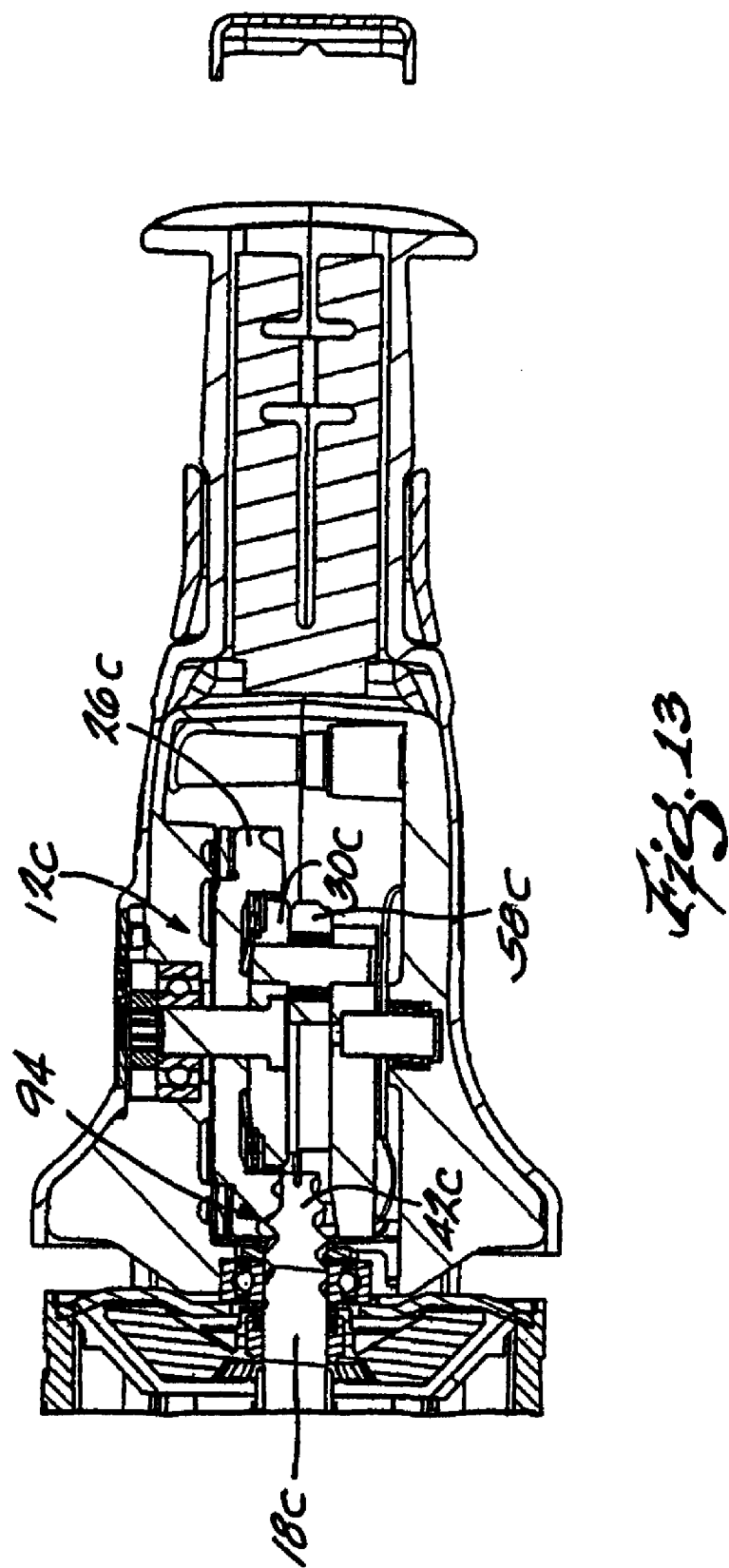
FIG. 13 is a top cross-sectional view of the reciprocating saw shown in FIG. 12, illustrating the slip clutch.
Figure 14:
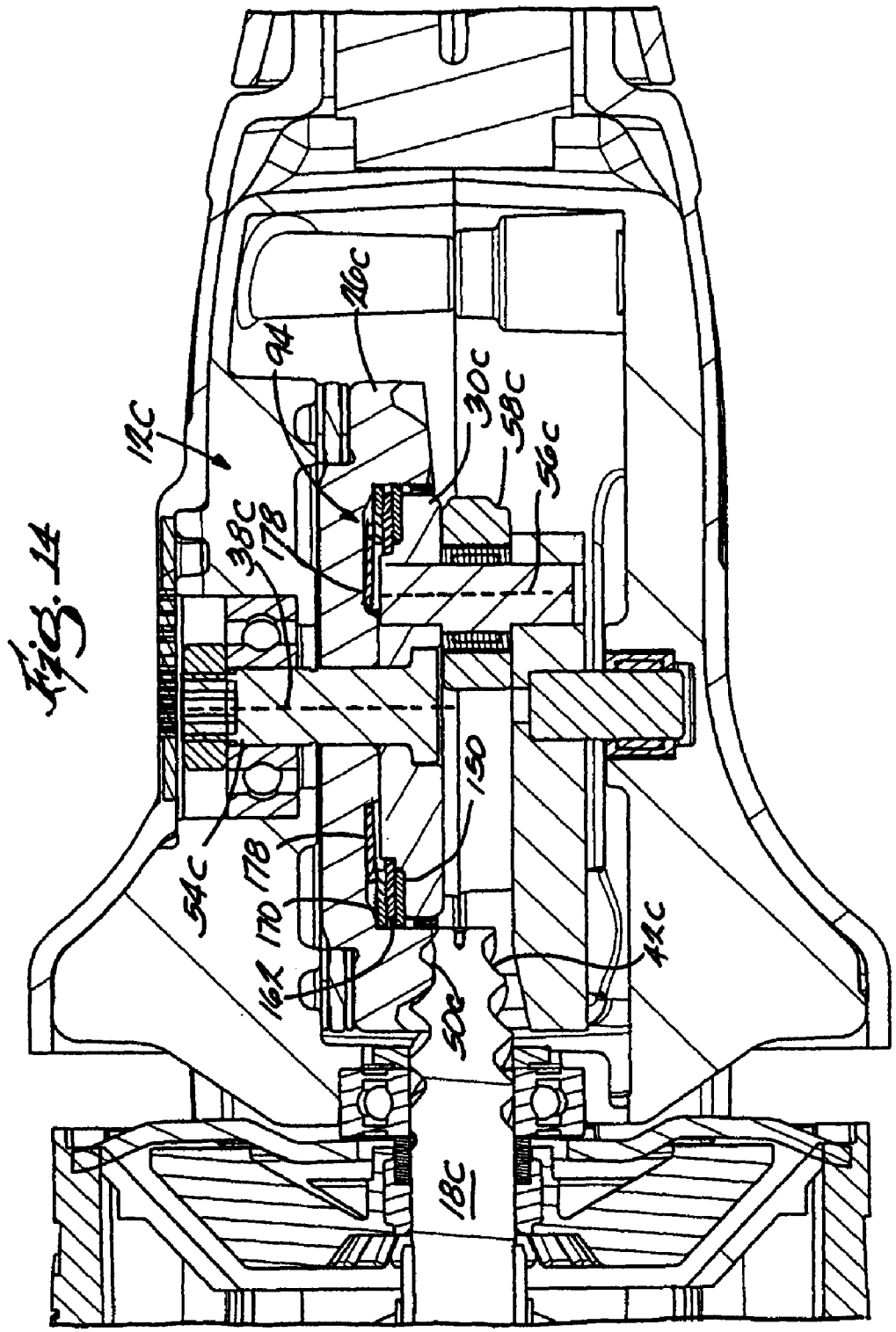
FIG. 14 is a partial top view showing the slip clutch of FIG. 13 in greater detail.

As shown in FIGS. 12-14, the drive mechanism 12C generally includes a gear 26C, a hub 30C, and a slip clutch 94 at least partially between the gear 26C and the hub 30C. The slip clutch 94 is positioned at least partially between the gear 26C and the hub 30C to selectively transmit drive force from the gear 26C to the hub 30C and to selectively allow relative movement between the gear 26C and the hub 30C to, for example, absorb an impact on the spindle 22C and/or on the blade (not shown). As described above with respect to FIGS. 2-5, the gear 26C drives the hub 30C, which in turn drives the spindle 22C.

In the illustrated construction, a drive arm 58C is connected between the drive member 54C and the spindle 22C to covert the rotational motion of the hub 30C into generally reciprocating motion of the spindle 22C. It is understood that the drive arm 58C may be the drive arm 58 as described above with respect to FIGS. 2-5, the drive arm 58A as described with respect to FIG. 7, the drive arm 58B as described with respect to FIG. 8, or any other suitable drive arm configuration.

Figure 15:
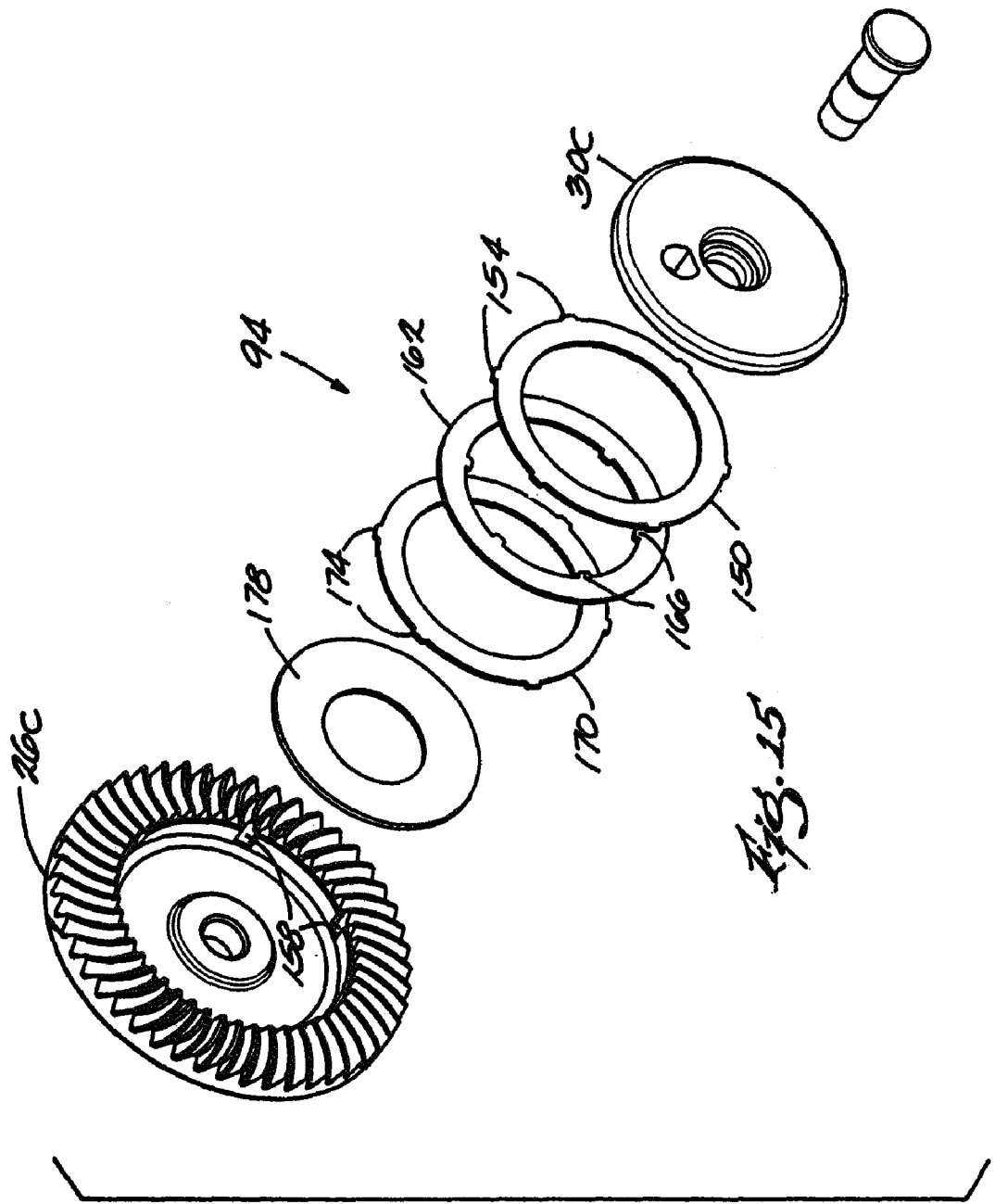
FIG. 15 is an exploded view of the slip clutch of FIG. 13.

FIG. 15 illustrates the slip clutch 94 in more detail. The function of the slip clutch is described in U.S. Pat. No. 5,689,891, issued Nov. 25, 1997 to Bednar, et al., the entire contents of which is incorporated herein by reference.

The slip clutch 94 generally includes a plurality of clutch disks 150, 162, 170 positioned between the gear 26C and the hub 30C. A first clutch disk 150 includes a plurality of radially-outwardly projecting splines 154 that cooperate with corresponding axially-extending grooves 158 on the inner surface of the gear 26C. Similarly, a third clutch disk 170 has corresponding radially-outwardly projecting splines 174 that cooperate with the grooves 158 on the gear 26C. A second clutch disk 162 is sandwiched between the first and third clutch disks 150, 170 and includes a plurality of radiallyinwardly projecting splines 166 that cooperate with corresponding axially-extending grooves (see FIG. 14) on the hub 30C. By providing three clutch disks 150, 162, 170, the illustrated slip clutch 94 provides four friction surfaces. It should be understood that in other constructions (not shown), the slip clutch 94 may have fewer or more clutch disks or may even include no clutch disks, in which case the slip clutch would comprise the frictional engagement between the gear 26C and the hub 30C.

The slip clutch 94 also includes a disk spring 178 that biases the clutch disks 150, 162, 170 together and then allows slippage if there is binding of the spindle 22C. The disk spring 178 also controls the frictional engagement between the gear 26C and the hub 30C. The clutch 94 will slip when the load on the spindle 22C (or on the motor 16C) exceeds the force applied by the disk spring 178, and the friction between the gear 26C, hub 30C, and clutch disks 150, 162, 170. More particularly, the clutch disks 150, 162, 170 will slip relative to either or both of the gear 26C and the hub 30C to absorb an impact.

FIGS. 16-19 illustrate another construction of a power tool, such as, for example, a reciprocating saw, (partially shown) including a drive mechanism 12D. Common elements are referred to by the same reference number "D".

The drive mechanism 12D generally includes a gear 26D, a hub 30D and structure, such as an elastic member 34D, at least partially between (in a force-transmitting and/or positional sense) the gear 26D and the hub 30D. As shown in FIGS. 16-19, the elastic member 34D is positioned in a pocket 62D defined in the gear 26D.

The elastic member 34D generally includes a body 35 and at least one and, in the illustrated construction, eight elastic member protrusions 74D connected to and extending radially outwardly from the body 35. Each elastic member protrusion 74D includes a first elastic element 182 and a second elastic element 184. The first elastic elements 182 are formed of an elastomeric material, such as, for example, rubber, silicone, neoprene, nitrile, EDM, or polymers of various durometer. In the illustrated construction and in some aspects, the first elastic elements 182 are integrally formed with the body 35 of the elastic member 34D, and both the body 35 and the first elastic elements 182 are formed from a single uniform material.

Figure 19:
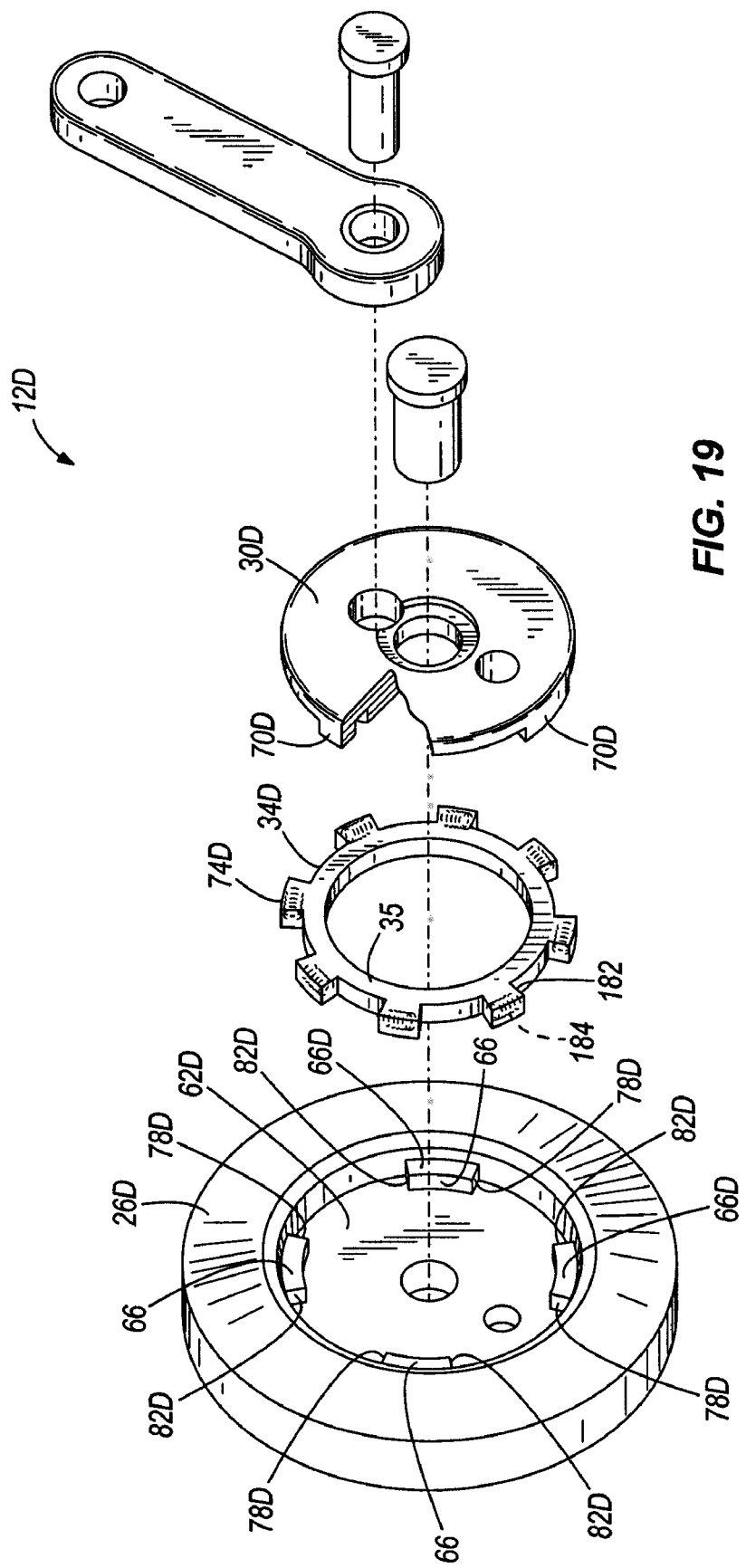
FIG. 19 is an exploded perspective view of a portion of the drive mechanism shown in FIG. 16.
Figure 20:
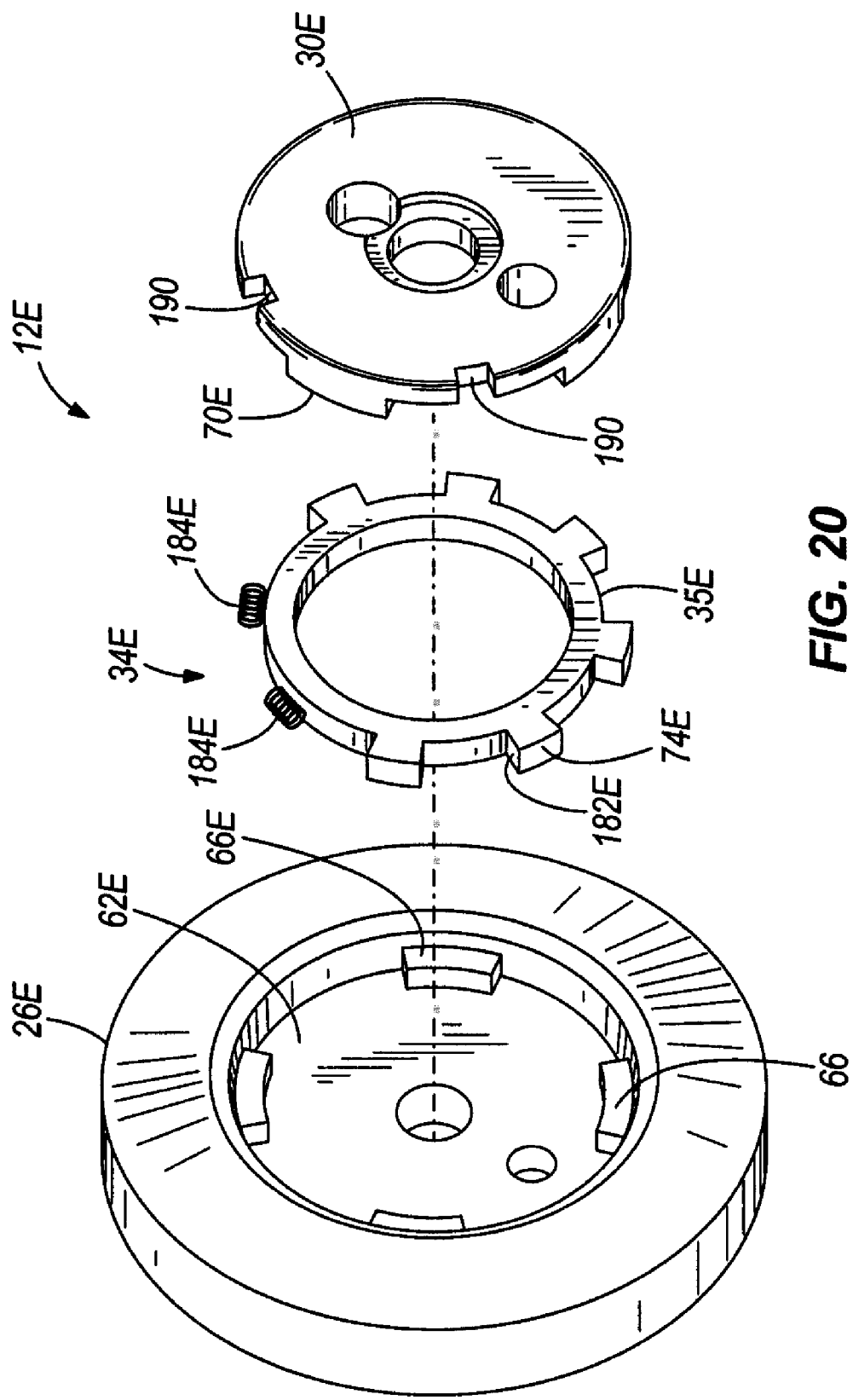
FIG. 20 is an exploded perspective view of an alternative construction of a drive mechanism.

In the construction illustrated in FIGS. 16 and 19, the second elastic elements 184 are integrally formed with the first elastic element 184. Specifically, in the illustrated construction, the first elastic elements 182 are formed (e.g., molded) around the second elastic elements 184. In other constructions (not shown), the second elastic elements 184 can be supported in pockets or recesses formed in the second elastic elements 184. In still other constructions (as shown in FIG. 20), the second elastic elements 184 can be positioned adjacent to and/or spaced between first elastic members 182.

In the illustrated construction, the second elastic elements 184 are coil springs. In other constructions, the second elastic elements 184 can be formed of an elastomeric material, such as, for example, rubber, silicone, neoprene, nitrile, EDM, or polymers of various durometer. In still other constructions (not shown), the second elastic elements 184 can have a geometry and/or construction providing elasticity and/or resiliency.

As shown in FIGS. 16 and 19, the elastic member protrusions 74D are positioned circumferentially between a gear protrusion first side 78D and a hub protrusion first side 86D, and another elastic member 74D is positioned circumferentially between a gear protrusion second side 82D and a hub protrusion second side 90D.

In operation, the gear 26D rotates the hub 30D. At startup and during normal operation, the engagement between the elastic member protrusions 74D, the gear protrusions 66D and the hub protrusions 70D and the driving force transmitted from the gear 26D through the elastic member 34D to the hub 70D may slightly compress the elastic member protrusions 74D. More particularly, the driving force-transmitting condition may slightly compress one or both of the first and second elastic elements 182, 184 of each of the elastic member protrusions 74D.

Each elastic member protrusion 74D is also selectively compressed to an impact-absorbing condition between each adjacent gear protrusion 66D and hub protrusion 70D to absorb impacts and to prevent wear or damage to the components of the reciprocating saw 10 (including the drive mechanism 12 and the motor 16). In the illustrated construction, the second elastic member 184 of each elastic protrusion 74D absorbs a first range of vibrations and/or impacts and the first elastic member 182, either alone or in combination with the second elastic member 182, absorbs a second higher range of vibrations and/or impacts.

For example, in some constructions and in some aspects, the second elastic elements 184 are compressed to absorb lower oscillation loads, such as, vibration generated by the drive mechanism 12D and/or motor 16 and vibration generated by the engagement of the a tool element and the workpiece during normal cutting operations. If the saw blade and/or the spindle 22 is stopped suddenly (e.g., because the saw blade has been pinched or binds in the workpiece or because the saw blade strikes a solid object, preventing the saw blade from reciprocating), the first and second elastic elements 182, 184 are both compressed to absorb larger impact loads.

FIG. 20 illustrates another construction of a power tool, such as, for example, a reciprocating saw (partially shown), including a drive mechanism 12E. Common elements are referred to by the same reference number "E".

As shown in FIG. 20, the drive mechanism 12E generally includes a gear 26E, a hub 30E and structure, such as an elastic member 34E, at least partially between (in a force-transmitting and/or positional sense) the gear 26E and the hub 30E. The elastic member 34E is positioned in a pocket 62E defined in the gear 26E.

In the illustrated construction, the elastic member 34E includes a body 35E and at least one and, in the illustrated construction, six elastic member protrusions 74E connected to and extending radially outwardly from the body 35E. Each elastic member protrusion 74E includes a first elastic element 182E integrally formed with the body 35E. In the illustrated construction, the first elastic elements 182E are formed of an elastomeric material, such as, for example, rubber, silicone, neoprene, nitrile, EDM, or polymers of various durometer. In other constructions (not shown), the first elastic elements 182E can have a geometery and/or construction providing elasticity and/or resiliency.

Second elastic elements 184E are spaced circumferentially around the pocket 62E of the gear 26E between gear protrusions 66E and the hub protrusions 70E. In the illustrated construction, the second elastic elements 184E are coil springs. In other constructions, the second elastic elements 184E can be formed of an elastomeric material, such as, for example, rubber, silicone, neoprene, nitrile, EDM, or polymers of various durometer. In still other constructions (not shown), the second elastic elements 184E can have a geometery and/or construction providing elasticity and/or resiliency.

In the illustrated construction of FIG. 20, windows or apertures 190 extend axially through the hub 30E and provide access to the second elastic elements 184E to facilitate assembly and maintenance of the drive mechanism 12E.

It should be understood that, for some aspects and in some constructions (not shown), the drive mechanism 12 may be another type of drive mechanism, such as, for example, a rotary-to-rotary motion drive mechanism. It should also be understood that, for some aspects and in some constructions (not shown), the drive mechanism 12 may be used with another driven mechanism in equipment other than power tools, such as, for example, compressors, engines, motors, pneumatic tools, appliances, hydraulic motors, generators, etc.

One or more of the above-identified and other independent features or independent advantages of the invention are set forth in the following claims:

We claim:

1. A reciprocating saw comprising:
   a motor including a drive shaft;
   an output member adapted to support a saw blade; and
   a drive mechanism including
      a drive assembly engaged with and driven by the drive shaft, and
      a drive arm drivingly connected between the drive assembly and the output member to transmit driving force from the drive assembly to the output member, the drive arm including
         a first portion pivotably coupled to the drive assembly,
         a second portion pivotably coupled to the output member and having a substantially similar shape as the first portion, and
         a flexible member interconnecting the first portion and the second portion,
   wherein the drive arm is pivotally coupled to the drive assembly and the output member about respective first and second parallel axes, wherein at least a portion of the drive arm is rotatable about a third axis substantially parallel with the first and second axes, and wherein the flexible member is configured to absorb an impact.

2. The reciprocating saw as set forth in claim 1, wherein the drive assembly includes a gear rotatably driven about the third axis by the drive shaft and drivingly connected to the drive arm.

3. The reciprocating saw as set forth in claim 2, wherein the drive assembly includes a drive member supported by the gear and offset from the third axis, the drive member being connected to the drive arm to drivingly connect the gear to the drive arm.

4. The reciprocating saw as set forth in claim 2, wherein the drive arm connects the gear to the output member to convert rotation of the gear to reciprocation of the output member.

5. The reciprocating saw as set forth in claim 2, wherein the drive assembly further includes
   a hub selectively driven by the gear, the hub rotatable about the third axis relative to the gear, and
   an elastic member positioned between the gear and the hub to absorb the impact.

6. The reciprocating saw set forth in claim 1, wherein the first and second portions of the drive arm are interlocked to limit the amount of deflection of the drive arm.

7. The reciprocating saw set forth in claim 1, wherein the flexible member has a flexure point to create an area of deformation to absorb the impact.

8. The reciprocating saw set forth in claim 7, wherein the flexure point is provided by a cut-out area.

9. The reciprocating saw as set forth in claim 1, wherein the output member is a reciprocatable spindle, and wherein the drive arm absorbs an impact resulting from a blade lock-up.

10. The reciprocating saw set forth in claim 1, wherein the flexible member is formed of a different material than the first portion and the second portion of the drive arm.

11. The reciprocating saw set forth in claim 10, wherein the flexible member is formed of an elastomeric material.

12. The reciprocating saw set forth in claim 10, wherein the flexible member is formed of rubber.

13. A reciprocating saw comprising:
    a motor including a drive shaft;
    an output member adapted to support a saw blade; and
    a drive mechanism including
       a drive assembly engaged with and driven by the drive shaft, and
       a drive arm drivingly connected between the drive assembly and the output member to transmit driving force from the drive assembly to the output member, the drive arm including
          a first portion pivotably coupled to the drive assembly and including a first hook and a first aperture,
          a second portion pivotably coupled to the output member and including a second hook and a second aperture, and
          a flexible member interconnecting the first portion and the second portion,
    wherein the drive arm is pivotally coupled to the drive assembly and the output member about respective first and second parallel axes, wherein at least a portion of the drive arm is rotatable about a third axis substantially parallel with the first and second axes, wherein the flexible member is configured to absorb an impact, wherein the first hook is at least partially received in the second aperture and the second hook is at least partially received in the first aperture, and wherein the flexible member at least partially surrounds the first and second hooks.

14. The reciprocating saw as set forth in claim 13, wherein the drive assembly includes a gear rotatably driven about the third axis by the drive shaft and drivingly connected to the drive arm.

15. The reciprocating saw as set forth in claim 14, wherein the drive assembly includes a drive member supported by the gear and offset from the third axis, the drive member being connected to the drive arm to drivingly connect the gear to the drive arm.

16. The reciprocating saw as set forth in claim 14, wherein the drive arm connects the gear to the output member to convert rotation of the gear to reciprocation of the output member.

17. The reciprocating saw set forth in claim 13, wherein the flexible member is formed of a different material than the first portion and the second portion of the drive arm.

18. The reciprocating saw set forth in claim 17, wherein the flexible member is formed of an elastomeric material.

19. The reciprocating saw set forth in claim 17, wherein the flexible member is formed of rubber.

20. The reciprocating saw set forth in claim 13, wherein the second portion of the drive arm has a substantially similar shape as the first portion of the drive arm.

* * * * *